(12) United States Patent
Xing et al.

(10) Patent No.: US 12,401,297 B2
(45) Date of Patent: Aug. 26, 2025

(54) DRIVE ASSEMBLY, MOTOR, AND TERMINAL

(71) Applicant: HUAWEI TECHNOLOGIES CO., LTD., Guangdong (CN)

(72) Inventors: Zengping Xing, Shenzhen (CN); Jun Wang, Dongguan (CN); Li-Te Kuo, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 386 days.

(21) Appl. No.: 18/169,919

(22) Filed: Feb. 16, 2023

(65) Prior Publication Data
US 2023/0198430 A1    Jun. 22, 2023

Related U.S. Application Data

(63) Continuation of application No. PCT/CN2021/098248, filed on Jun. 4, 2021.

(30) Foreign Application Priority Data

Aug. 17, 2020    (CN) .......................... 202010827864.6

(51) Int. Cl.
*H02N 2/10*        (2006.01)
*H02N 2/00*        (2006.01)

(52) U.S. Cl.
CPC ............. *H02N 2/103* (2013.01); *H02N 2/001* (2013.01); *H02N 2/005* (2013.01)

(58) Field of Classification Search
CPC ........ H02N 2/103; H02N 2/001; H02N 2/005; H02N 2/002; H02N 2/06; H02N 2/14
See application file for complete search history.

(56) References Cited

U.S. PATENT DOCUMENTS

| | | |
|---|---|---|
| 2,439,499 A | 4/1948 | Williams et al. |
| 5,532,540 A | 7/1996 | Claeyssen et al. |
| (Continued) | | |

FOREIGN PATENT DOCUMENTS

| | | |
|---|---|---|
| CN | 100354678 C | 12/2007 |
| CN | 102005967 A | 4/2011 |
| (Continued) | | |

OTHER PUBLICATIONS

Zengping Xing:"A Miniature Cylindrical Piezoelectric Motor With an Asymmetric Vibrator". IEEE Transactions on Ultrasonics, Ferroelectrics, and Frequency Control, vol. 60, No. 7, Jul. 2013, total 7 pages.

(Continued)

*Primary Examiner* — Emily P Pham

(57) ABSTRACT

This application relates to a drive assembly, a motor, and a terminal. The drive assembly includes a stator and a rotor. The stator includes an excitation part, a vibration part, a first fixed part, and a pushing part. The vibration part is connected to the excitation part. The first fixed part is connected to the vibration part, and the vibration part is located between the excitation part and the first fixed part along a first direction L. The pushing part is connected to the vibration part and the rotor. The excitation part is capable of vibrating, and the excitation part is capable of driving the vibration part to act. Under limiting by the first fixed part, the vibration part is capable of vibrating at least along the first direction L and a second direction W.

20 Claims, 10 Drawing Sheets

(56) References Cited

U.S. PATENT DOCUMENTS

| | | | |
|---|---|---|---|
| 7,309,943 | B2 | 12/2007 | Henderson et al. |
| 7,368,853 | B2 | 5/2008 | Magnussen et al. |
| 7,429,812 | B2 | 9/2008 | Witteveen et al. |
| 7,598,656 | B2 | 10/2009 | Wischnewskij et al. |
| 8,441,170 | B2 * | 5/2013 | Ho .................. H02N 2/026 310/323.12 |
| 8,482,185 | B2 | 7/2013 | Wischnewskij et al. |
| 2015/0076965 | A1 | 3/2015 | Culpi |

FOREIGN PATENT DOCUMENTS

| | | | |
|---|---|---|---|
| CN | 108780838 A | | 11/2018 |
| CN | 110914785 A | | 3/2020 |
| EP | 1192704 B1 | | 10/2006 |
| EP | 1656705 B1 | | 7/2008 |
| EP | 1812975 B1 | | 7/2008 |
| EP | 101019301 B | | 7/2011 |
| JP | H05121790 A | | 5/1993 |
| JP | H1169852 A | | 3/1999 |
| JP | 2007507997 A | | 3/2007 |
| JP | 2011206634 A | | 10/2011 |
| JP | 2014140271 A | | 7/2014 |

OTHER PUBLICATIONS

Zhang Yangkun et al: "A Novel Stick-Slip Piezoelectric Actuator Based on a Triangular Compliant Driving Mechanism", Jul. 2019, XP011712584, total 9 pages.

Kenji Uchino, Piezoelectric ultrasonic motors: overview, Oct. 20, 1997, 13 pages.

Extended European Search Report for Application No. 21857284 dated Dec. 22, 2023, 12 pages.

Japanese Office Action for Application No. 2023-511986 dated Mar. 28, 2024, 13 pages.

PCT International Search Report for Application No. PCT/CN2021/098248 dated Jun. 4, 2021, 9 pages.

* cited by examiner

DRIVE ASSEMBLY, MOTOR, AND TERMINAL

CROSS-REFERENCE TO RELATED APPLICATIONS

This application is a continuation of International Application No. PCT/CN2021/098248, filed on Jun. 4, 2021, which claims priority to Chinese Patent Application No. 202010827864.6, filed on Aug. 17, 2020. The disclosures of the aforementioned applications are hereby incorporated by reference in their entireties.

TECHNICAL FIELD

This application relates to the field of electronic product technologies, and in particular, to a drive assembly, a motor, and a terminal.

BACKGROUND

In a piezoelectric motor (usually operating at an ultrasonic frequency band and also referred to as an ultrasonic motor, Ultrasonic Motor, USM for short), an isomorphic piezoelectric unit drives a resonator to vibrate, so that elliptic movement in a specific direction is formed at some positions on the resonator, to drive a rotor in contact with the positions to move. In this type of piezoelectric motor, dual drives are usually used to vibrate at a corresponding frequency, to form elliptic movement. However, with a miniaturization requirement for a motor, low-voltage driving required for miniaturization usually requires a high electromechanical coupling coefficient of the motor. This causes sharp degradation of performance when a frequency slightly deviates from resonance frequency, increasing difficulty of dual-drive degeneracy. Therefore, a motor for implementing bidirectional movement control by using a single drive is required. However, inner space of this type of motor is small due to a miniaturization design. A vibration part configured to drive a rotor to move is disposed as a corresponding swing arm, and the swing arm moves correspondingly with a change of a frequency. However, structural stability of this type of swing arm is poor. In addition, when the rotor is driven to move, a driving effect is poor, a specific deviation may occur, and the swing arm is easily damaged.

SUMMARY

An objective of this application is to provide a drive assembly, a motor, and a terminal, so that on the basis of miniaturizing a motor, during driving, stability of a drive assembly during movement in different modes can be higher, precision of movement can be improved, and a service life can be extended.

This application provides a drive assembly, where the drive assembly includes a stator and a rotor, the stator is configured to drive the rotor to move, and the stator includes:
an excitation part;
a vibration part, where the vibration part is connected to the excitation part;
a first fixed part, where the first fixed part is connected to the vibration part, and the vibration part is located between the excitation part and the first fixed part along a first direction L; and
a pushing part, where the pushing part is connected to the vibration part and the rotor, where the excitation part is capable of vibrating, the excitation part is capable of driving the vibration part to act, and under limiting by the first fixed part, the vibration part is capable of vibrating at least along the first direction L and a second direction W, so that the pushing part pushes the rotor to move along the first direction L; and the first fixed part is configured to limit moving distances of the pushing part along the first direction L and the second direction W by using the vibration part.

In the drive assembly for single-phase driving, due to a requirement for miniaturizing a motor, inner space of the drive assembly is small, and fitting between components is tight. To meet a movement requirement of the rotor in limited space and different frequency modes and improve precision and stability of movement, the first fixed part is disposed, to limit the vibration part between the excitation part and the first fixed part, so that the excitation part can vibrate correspondingly in a corresponding specified frequency mode, and the vibration can be transmitted to the vibration part. In the first direction L, because the first fixed part is disposed and the excitation part vibrates in a direction toward the vibration part, stress can be applied to the vibration part, and the vibration part can vibrate at least along the first direction L and the second direction W. In the specified frequency mode, a phase difference between vibration along the first direction L and vibration along the second direction W can drive the pushing part disposed on the vibration part to move in a corresponding direction. In addition, under limiting by the first fixed part, the moving distances of the pushing part along the first direction L and the second direction W are limited, so that the pushing part can form a corresponding elliptic moving track. When the pushing part moves along the elliptic moving track, the pushing part can abut against the rotor and apply pressure to the rotor. Under the pressure, the rotor in contact with a corresponding position can be pushed by the pushing part to move linearly or rotate. This avoids poor stability of the stator that drives the rotor to move in small space in the miniaturized motor, reduces a loss of the stator, and extends a service life.

In a possible design, the vibration part is deformable; and
under limiting by the first fixed part, vibration of the excitation part is capable of deforming the vibration part at least along the first direction L and the second direction W, and the pushing part is disposed at a position, in the vibration part, that is deformable along the first direction L and the second direction W.

Under limiting by the first fixed part, the vibration part is deformed to form an elliptic moving track at a position at which the pushing part is disposed in the vibration part, so that stability is higher.

In a possible design, the vibration part is an annular mechanical part, so that the vibration part is deformable;
along the first direction L, the first fixed part and the excitation part are disposed opposite to each other on two sides of the annular mechanical part, and the annular mechanical part has an inner wall; and
when the excitation part vibrates, a distance between two opposite sides of the inner wall along the first direction L increases, a distance between two opposite sides of the inner wall along the second direction W decreases, and the pushing part is disposed at a position at which a distance between two opposite sides of the inner wall is capable of decreasing; or
a distance between two opposite sides of the inner wall along the first direction L decreases, a distance between two opposite sides of the inner wall along the second direction W increases, and the pushing part is disposed at a position at which a distance between two opposite sides of the inner wall is capable of increasing.

The annular mechanical part is disposed, and has a feature that a structure of the annular mechanical part is deformable under the action of an external force. Therefore, under limiting by a corresponding fixed part, vibration of the excitation part along the first direction L can cause tensile or compressive stress to the annular structure, and a distance between two opposite sides of the inner wall of the annular structure increases or decreases under the action of the stress. When the annular mechanical part is deformed due to extrusion (or stretching) caused by the stress along the first direction L, deformation due to expansion (or extrusion) along the second direction W occurs based on transmission of the force, and the vibration part can form a stable elliptic moving track as required, so that the pushing part forms a stable elliptic moving track.

In a possible design, the pushing parts are symmetrically arranged on two sides of the annular mechanical part along the second direction W, and the pushing parts are disposed at positions, in the annular mechanical part, at which a distance between two opposite sides of the inner wall is the farthest.

To enable the pushing parts disposed on the annular mechanical part to move at least along the first direction L and the second direction W to form an elliptic moving track, and to prevent the annular mechanical part from abutting against the rotor and affecting a use effect of the pushing parts during deformation, the pushing parts may be disposed at positions at which a distance between two opposite sides of the inner wall is the farthest, to ensure stability of pushing, by the pushing parts, the rotor to move, and improve precision of movement.

In a possible design, the vibration part is an elastic part, and the vibration part is elastically deformable at least along the first direction L and the second direction W; and
  the pushing parts are disposed at two ends of the elastic part in an elastic deformation direction.

Based on characteristics of the elastic part, during vibration, the elastic part is deformed due to expansion (or contraction) along a direction other than the first direction L, that is, the second direction W. Deformation along the first direction L and deformation along the second direction W are combined, so that the vibration part can have a phase difference in the first direction L and the second direction W, and can perform corresponding elliptic movement. In addition, the pushing part disposed at an end of the vibration part can form an elliptic moving track of regular movement to drive the rotor to move, thereby improving stability of movement of the rotor.

In a possible design, the vibration part includes two or more connecting rods, at least two adjacent connecting rods are connected and form a connecting end, and there is a first included angle between the connected connecting rods;
  when the excitation part vibrates, the first included angle is capable of increasing or decreasing, so that the vibration part is deformable; and
  the pushing part is disposed at a position close to the connecting end.

In this manner of disposing the connecting rods, when the excitation part vibrates, under limiting by a corresponding fixed part, the vibration of the excitation part can act on the vibration part. The connecting rods are subject to extrusion or tensile stress, so that the first included angle increases or decreases correspondingly. When the first included angle changes, two ends of the connecting rods that are respectively connected to the excitation part and the first fixed part are close to or away from each other, and the connecting rods also move correspondingly along the second direction W. Therefore, the connecting rods have a phase difference in the first direction L and the second direction W, and at least a part of the connecting rods can form an elliptic moving track, thereby improving stability of movement of the pushing part, and improving precision of forming an elliptic moving track.

In a possible design, there are two connecting rods, and the connecting rods are connected to form a structure in a V shape, to form the first included angle;
  the two connecting rods are respectively connected to the excitation part and the first fixed part; and
  the pushing part is connected to the connecting end.

The connecting rods are fit in the structure in the V shape, and the structure has specific stability and strength. When the structure is under pressure and the first included angle changes, controllability of driving the pushing part to perform corresponding elliptic movement is higher, thereby improving stability of driving the rotor to move.

In s possible design, a cross-sectional area of the connecting rod gradually increases along an axial direction of the connecting rod and in a direction away from the connecting end.

A cross section gradually changes, so that structural stability of connecting, by the connecting rod, the excitation part and the first fixed part is higher, and vibration from the excitation part can be better transmitted, without affecting an increase or a decrease of the first included angle. Movement of the rotor can be controlled by using a low frequency, thereby improving a use effect of the drive assembly.

In a possible design, there are three connecting rods, and the connecting rods are sequentially connected to form an open structure;
  two outermost connecting rods are respectively connected to the excitation part and the first fixed part; and
  the pushing part is connected to the connecting rod located in the middle.

The pushing part is connected to the connecting rod at the middle position, so that stability and reliability of the connection between the pushing part and the connecting rod can be improved, and the pushing part is not easily damaged when pushing the rotor to move, thereby extending a service life of the pushing part.

In a possible design, there are four or more connecting rods, and the plurality of connecting rods are connected head to tail to form an enclosed polygonal structure; and
  the excitation part and the first fixed part each are connected to the connecting end along the first direction L, and the pushing part is connected to the connecting end along the second direction; or
  the excitation part and the first fixed part each are connected to the connecting rod along the first direction L, and the pushing part is connected to the connecting rod along the second direction W.

In the enclosed polygonal connection manner, structural stability and strength are high. When the pushing part pushes the rotor to move, an elliptic moving track does not deviate due to poor stability to reduce stability of movement of the rotor.

In a possible design, the plurality of the connecting rods are integrally molded.

This can better convert vibration into a required elliptic moving track while meeting a requirement for structural stability of the vibration part.

In a possible design, the pushing part is a convex structure extending from the vibration part along the second direction W, and the convex structure is capable of pushing the rotor to reciprocate along the first direction L.

The convex structure that at least partially extends out of the vibration part along the second direction W is disposed. This facilitates fitting between the pushing part and the rotor, and prevents deformation of the vibration part from causing other parts of the vibration part to get in contact with the rotor, affecting stability of driving, by the pushing part, the rotor to move, and affecting an elliptic moving track of the pushing part.

In a possible design, the stator further includes a second fixed part, configured to enable vibration of the excitation part to act on the vibration part; and along the first direction L, the second fixed part is connected to a side, of the excitation part, that is away from the vibration part, and a distance between the first fixed part and the second fixed part is fixed.

The first fixed part and the second fixed part are disposed. When the first fixed part and the second fixed part are fastened to a motor, the connected excitation part and vibration part are limited between the first fixed part and the second fixed part. Therefore, when the excitation part vibrates, the excitation part can move only in a direction toward the vibration part under limiting by the second fixed part. In this case, under limiting by the first fixed part, a position at which the vibration part is connected to each of the excitation part and the first fixed part is subject to at least compressive or tensile stress from the first direction L, and the vibration part is deformed. In addition, based on an arrangement of a structure of the vibration part, deformation can occur at least along the second direction W, so that at least a part of the vibration part (a position at which the pushing part is disposed) performs elliptic movement.

In a possible design, the excitation part includes:

a body, where the body is configured to connect to the vibration part; and a driving part, where the driving part is connected to the body, and is configured to drive, in a single-phase mode, the body to vibrate, where the driving part has a preset vibration frequency, and under the action of the preset vibration frequency, vibration of the body is capable of causing the vibration part to vibrate at least along the first direction L and the second direction W.

Single-phase driving can be implemented, so that the excitation part can vibrate at a corresponding frequency (a resonator frequency), thereby reducing space occupied in fitting of a driving structure in a simple driving mode.

In a possible design, the driving part is connected to at least one side of the body along the second direction W.

Therefore, the driving part can drive the connected body to have a good vibration effect.

In a possible design, the driving part includes:

a deformable part, where the deformable part is connected to the body, and the deformable part is deformable after being energized; and an energizing part, where the energizing part is connected to the deformable part, and electricity generated by the energizing part is capable of being transmitted to the deformable part, where the energizing part is capable of generating an electric field at the preset frequency, and the deformable part is deformed under the action of the electric field to drive the body to vibrate.

Therefore, the driving part can convert electric energy into vibration in a required frequency mode, and the connected body is driven to vibrate correspondingly to be stretched or compressed, so that the connected vibration part is driven to be deformed due to stretching or compressing along the first direction.

In a possible design, the body, the vibration part, and the first fixed part are integrally molded. This can improve structural stability of connected parts, and improve a vibration transmission effect.

This application further provides a motor. The motor includes a drive assembly. The drive assembly is the drive assembly according to any one of the foregoing implementations. Advantages of the motor are the same as those of the drive assembly, and are not specifically described herein.

This application further provides a terminal, including a motor. The motor is the motor described above. Advantages of the terminal are the same as those of the drive assembly, and are not specifically described herein.

It should be understood that the foregoing general descriptions and the following detailed descriptions are merely examples, and are not intended to limit this application.

REFERENCE NUMERALS

1: second fixed part; 2: excitation part; 21: body; 22: deformable part; 23: energizing part; 3: pushing part; 4: vibration part; 41: connecting rod; 411: V shape; 42: elastic part; 43: annular mechanical part; 431: inner wall; 44: connecting rod; 5: first fixed part; and 6: rotor.

The accompanying drawings herein are incorporated into the specification as a part of the specification. The accompanying drawings show embodiments that conform to this application, and are used with the specification to explain principles of this application.

DESCRIPTION OF EMBODIMENTS

The terms used in embodiments of this application are merely for the purpose of illustrating specific embodiments, and are not intended to limit this application. The terms "a", "the" and "this" of singular forms used in embodiments and the appended claims of this application are also intended to include plural forms, unless otherwise specified in the context clearly.

An embodiment of this application provides a terminal. A motor is disposed in the terminal. The terminal may be an electronic product such as a mobile phone or a camera. This is not specifically limited herein. However, for the motor disposed in the terminal, as an electronic product such as a mobile phone becomes lighter and thinner, inner space is reduced, and space occupied by the motor that is used in the terminal to drive a corresponding component to move is also reduced. Therefore, overall space occupied by the motor needs to be reduced, to miniaturize the motor. To minimize a size of the motor for miniaturization, miniaturization of structural fitting of a drive assembly that is an important part of the motor significantly influences an overall thinning design of the motor. Therefore, miniaturizing the drive assembly to the maximum extent may be used as a design idea for miniaturization of the motor. The drive assembly disposed in the motor includes a stator and a rotor 6. The stator is configured to drive the rotor 6 to move. The following fitting manner is used: A piezoelectric unit drives a resonator to vibrate, so that elliptic rotation in a specific direction occurs at a specific position or some positions on the resonator, to drive the rotor 6 in contact with the position to move. This can reduce, to some extent, space occupied during operating of the drive assembly. In this type of piezoelectric motor, the stator drives the rotor 6 in fit with the stator to move linearly or rotate based on driving by a disposed driving part. Due to complexity of an internal structure of the motor, low-voltage driving required for miniaturization usually requires a high electromechanical coupling coefficient of the motor. This causes sharp degradation of performance when a frequency slightly deviates from resonance frequency, increasing difficulty of frequency degeneracy during multi-phase driving. Therefore, single-phase driving is used, to improve stability of a driving frequency while implementing a miniaturization design.

Figure 1:
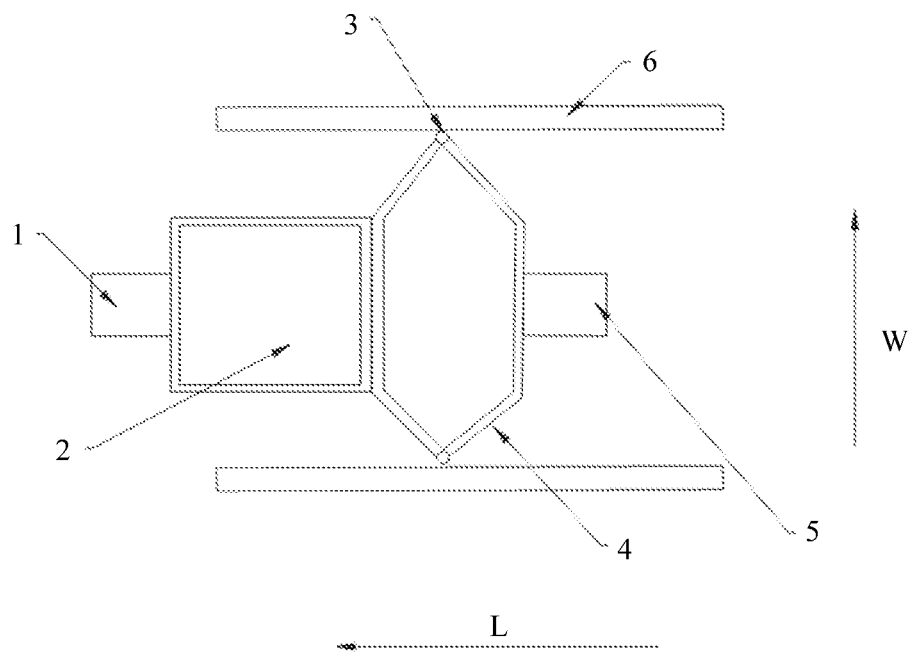
FIG. 1 is a main view of a drive assembly according to an embodiment of this application, where a direction indicated by an arrow L is a first direction, and a direction indicated by an arrow W is a second direction.
Figure 2:
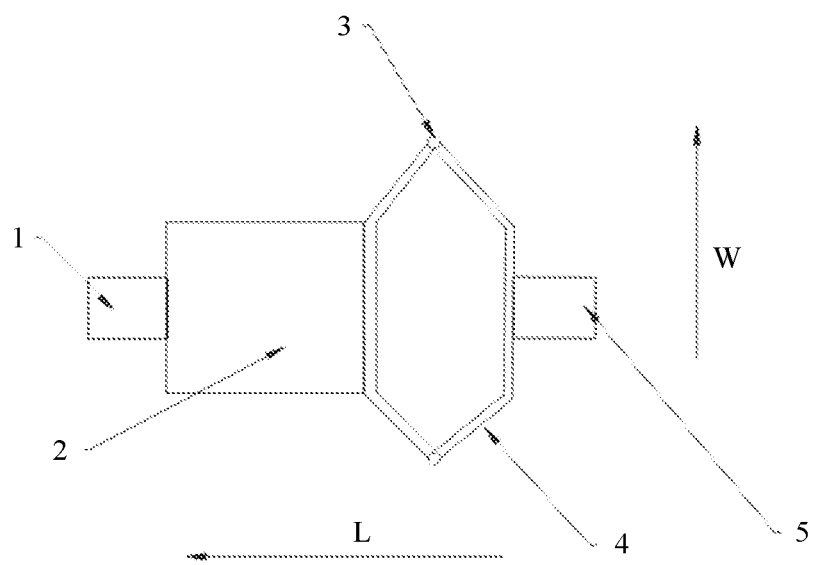
FIG. 2 is a main view of a stator according to an embodiment of this application, where a direction indicated by an arrow L is a first direction, and a direction indicated by an arrow W is a second direction.
Figure 11:
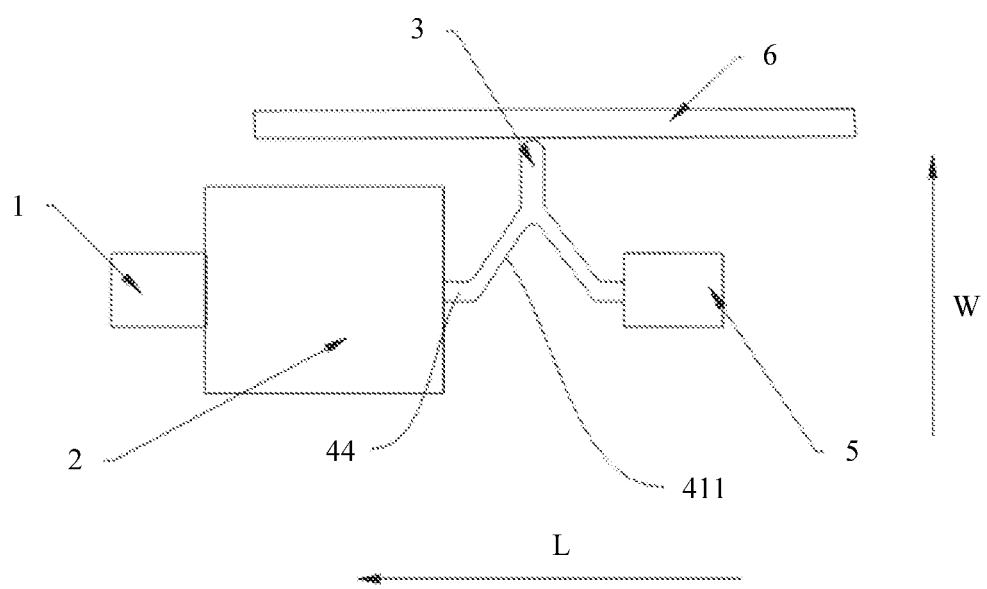
FIG. 11 is a simple schematic diagram of a structure of structural fitting of a third vibration part according to an embodiment of this application, where a direction indicated by an arrow L is a first direction, and a direction indicated by an arrow W is a second direction.

In the drive assembly for single-phase driving, due to a requirement for miniaturizing the motor, inner space of the drive assembly is small, and fitting between components is tight. To meet a movement requirement of the rotor 6 in limited space and different frequency modes and improve precision and stability of movement, as shown in FIG. 1, FIG. 2, and FIG. 11, the stator includes an excitation part 2, a vibration part 4, a first fixed part 5, and a pushing part 3. The vibration part 4 is connected to the excitation part 2. The first fixed part 5 is connected to the vibration part 4, and the vibration part 4 is located between the excitation part 2 and the first fixed part 5 along a first direction L. The pushing part 3 is connected to the vibration part 4 and the rotor 6. The excitation part 2 is capable of vibrating, and the excitation part 2 is capable of driving the vibration part 4 to act. Under limiting by the first fixed part 5, the vibration part 4 is capable of vibrating at least along the first direction L and a second direction W, so that the pushing part 3 pushes the rotor 6 to move along the first direction L. The first fixed part 5 is configured to limit moving distances of the pushing part 3 along the first direction L and the second direction W by using the vibration part 4. The first fixed part 5 is disposed, to limit the vibration part 4 between the excitation part 2 and the first fixed part 5, so that the excitation part 2 can vibrate correspondingly in a corresponding specified frequency mode, and the vibration can be transmitted to the vibration part 4. In the first direction L, because the first fixed part 5 is disposed and the excitation part 2 vibrates in a direction toward the vibration part 4, stress can be applied to the vibration part 4, and the vibration part 4 can vibrate at least along the first direction L and the second direction W. In the specified frequency mode, a phase difference between vibration along the first direction L and vibration along the second direction W can drive the pushing part 3 disposed on the vibration part to move in a corresponding direction. In addition, under limiting by the first fixed part 5, the moving distances of the pushing part 3 along the first direction L and the second direction W are limited, so that the pushing part 3 can form a corresponding elliptic moving track. When the pushing part 3 moves along the elliptic moving track, the pushing part 3 can abut against the rotor 6 and apply pressure to the rotor 6. Under the pressure, the rotor 6 in contact with a corresponding position can be pushed by the pushing part 3 to move linearly or rotate. This may be simply understood as follows: The disposed excitation part 2 is adjusted to a corresponding frequency mode according to a requirement that the rotor 6 needs to move linearly or rotate correspondingly when the stator is in fit with the rotor 6, so that the excitation part 2 vibrates correspondingly in the frequency mode. During vibration, because vibration occurs along the first direction L, the excitation part 2 applies, to the vibration part 4, deformation caused by the vibration. In addition, under limiting by a position of the first fixed part 5, the deformation of the excitation part 2 causes the vibration part 4 to be pressed against or stretched by stress along the first direction L, and the vibration part 4 can move along the second direction W while being pressed against or stretched along the first direction L. Under a combination of movement along the first direction L and movement along the second direction W, elliptic movement occurs at a corresponding position on the vibration part 4, so that the rotor 6 in contact with the position is driven to move correspondingly. The vibration part 4 and the first fixed part 5 are disposed, so that the vibration part 4 can perform stable elliptic movement, to drive a corresponding rotor 6 to move. This avoids poor stability of the stator that drives the rotor 6 to move in small space in the miniaturized motor, reduces loss of the stator, and extends a service life.

In structural fitting in which the moving distances of the pushing part 3 along the first direction L and the second direction W are limited to form an elliptic moving track, because the motor is miniaturized, an arc of an elliptic moving track of the motor is smooth, and a distance at which the rotor 6 needs to be driven to move is also small. Therefore, during elliptic movement of the pushing part 3, movement along the second direction W is mainly intended to make the pushing part 3 abut against the rotor 6 and apply an extrusion force to the rotor 6, so that the pushing part 3 can more stably drive the rotor 6 to move or rotate along the first direction L.

Herein, it should be emphasized that, for the mentioned frequency mode, there may be a plurality of frequency modes in the excitation part 2, and the frequency mode varies with different frequencies during electric driving. During single-phase driving, elliptic movement of upper and lower ends of the vibration part 4 in different frequency modes is clockwise or counterclockwise, so that the rotor can be pushed to move in a positive direction or a negative direction, thereby implementing bidirectional movement through single-phase driving. A change of a frequency mode can affect at least a vibration direction and a vibration amplitude of the excitation part 2, so that an elliptic moving track at a specific position (a position at which the pushing part 3 is disposed) in the vibration part 4 is finally changed, and the rotor 6 in fit with the vibration part 4 can be controlled to reciprocate along a straight line and/or rotate. Therefore, for the disposed motor, a frequency mode of the motor needs to be adjusted correspondingly based on an actual use situation, so that the rotor 6 can reciprocate linearly by a corresponding distance and/or the rotor 6 rotates relative to the stator. This is not specifically limited herein. In addition, for the aforementioned first direction L and second direction W, there is at least a non-zero included angle between the two directions, and the specified included angle between the first direction L and the second direction W varies when a specific structure of the vibration part 4 along the second direction W varies, when vibration along the first direction L causes a change of a structure of the vibration part 4 along the second direction W, or the like, provided that final vibration of the vibration part 4 can push the rotor 6 to move correspondingly. This is not specifically limited herein.

Specifically, to enable the disposed vibration part 4 to drive, in a corresponding frequency mode and under limiting by the first fixed part 5 and the excitation part 2, the pushing part 3 to form an elliptic track in a stable direction (clockwise or counterclockwise) and stably push the rotor 6 to move correspondingly, as shown in FIG. 2, the vibration part 4 is deformable. Under limiting by the first fixed part 5, the vibration part 4 is deformed due to stress, and the vibration part 4 can be deformed at least long the second direction W. Vibration of the excitation part 2 can deform the vibration part 4 at least along the first direction L and the second direction W. The pushing part 3 is disposed at a position, in the vibration part 4, that is deformable along the first direction L and the second direction W. The vibration part 4 is disposed as a deformable component, so that the excitation part 2 applies a tensile force or an extrusion force to the vibration part 4 in limited space along the first direction L under limiting by the first fixed part 5. In addition, the vibration part 4 can be deformed, so that the vibration part 4 can be deformed due to expansion or contraction along the first direction L. The deformation along the direction can drive the vibration part 4 to be deformed at least along the second direction W. A corresponding displacement transformation capability can be implemented through deformation movement along the two directions, so that at least a part of the vibration part 4 moves along a corresponding elliptic track. Therefore, the pushing part 3 is disposed at a position, in the vibration part 4, at which an elliptic moving track can be formed. In this manner in which the vibration part 4 is deformable, within a minimum space range, the vibration part 4 can form an elliptic moving track under the action of vibration in a corresponding frequency mode, so that the pushing part 3 that also forms an elliptic moving track is driven to push the rotor 6 to move. This structural fitting is simple. Under limiting by the first fixed part 5, the vibration part 4 is deformed to form an elliptic moving track at a position at which the pushing part 3 is disposed in the vibration part 4, so that stability is higher.

In addition, to better transmit vibration from the excitation part 2 to the vibration part 4 to drive the vibration part 4 to be deformed due to stretching or extrusion along the first direction L, so that the vibration part 4 better performs corresponding elliptic movement through deformation under limiting by the first fixed part 5 and under a corresponding force applied by the excitation part 2 to the vibration part 4, so as to drive the pushing part 3 to move along the first direction L and the second direction W and drive the pushing part 3 to perform elliptic movement due to a limitation on a moving distance along a corresponding direction, the stator further includes a second fixed part 1, configured to enable vibration of the excitation part 2 to act on the vibration part 4. Along the first direction L, the second fixed part 1 is connected to a side, of the excitation part 2, that is away from the vibration part 4, and a distance between the first fixed part 5 and the second fixed part 1 is fixed. The first fixed part 5 and the second fixed part 1 are disposed. When the first fixed part 5 and the second fixed part 1 are fastened to the motor, the connected excitation part 2 and vibration part 4 are limited between the first fixed part 5 and the second fixed part 1. Therefore, when the excitation part 2 vibrates, the vibration can apply only to the vibration part 4 under limiting by the second fixed part 1. In this case, under limiting by the first fixed part 5, a position at which the vibration part 4 is connected to each of the excitation part 2 and the first fixed part 5 is subject to at least compressive or tensile stress from the first direction L, and the vibration part 4 is deformed due to compression or stretching. In addition, based on an arrangement of a structure of the vibration part 4, deformation can occur at least along the second direction W. A phase difference caused by deformation of the vibration part 4 along the first direction L and the second direction W results in elliptic movement of the pushing part 3 and an end of the vibration part 4.

More specifically, as shown in FIG. 2 and FIG. 11, structural fitting in which the pushing part 3 and the end of the vibration part 4 can move along an elliptic track to drive a corresponding rotor 6 to move and/or rotate is described below by using movement of the rotor 6 as an example. This is not separately emphasized in the following descriptions, and elliptic tracks in different frequency modes can be adjusted adaptively according to requirements. The pushing part 3 forms an elliptic moving track. Based on different phase differences caused by deformation of the vibration part 4 along the first direction L and the second direction W, moving distances of the pushing part 3 along the first direction L and the second direction W are also different, so that different elliptic moving tracks are formed. Specifically, when the excitation part 2 vibrates, the vibration part 4 vibrates and is deformed, so that the vibration part 4 has a displacement transformation capability along the first direction L and the second direction W, so as to drive the connected pushing part 3 to form a final elliptic moving track to push the rotor 6 to move correspondingly. In this process, after a frequency mode is adjusted, intensity and a direction of elliptic movement of the pushing part 3 can be determined by observing a moving direction and speed of the rotor 6. Elliptic movement of the pushing part 3 usually varies in different frequency modes. Therefore, a frequency mode corresponding to the moving direction of the rotor 6 can be obtained through observation. When the rotor 6 needs to move in a specific direction, a corresponding frequency mode can be excited only through vibration of the excitation part 2 at a corresponding frequency, so that the pushing part 3 is excited to push the rotor 6 to move along a specific direction. In addition, the pushing part 3 is disposed, thereby avoiding excessive surface contact between the vibration part 4 and the rotor 6, and avoiding damage to the vibration part 4 due to excessive friction. Herein, it should be emphasized that, for a specific position at which the pushing part 3 is disposed in the vibration part 4, a corresponding position may be selected for connecting the pushing part 3 based on specific structural fitting of the vibration part 4 and a displacement change of vibration in the vibration part 4, so that the pushing part 3 can better transform vibration of the vibration part 4 into a stable elliptic moving track. In addition, in a process in which the pushing part 3 pushes the rotor 6 to move, deformation of the vibration part 4 does not result in direct contact with the rotor 6 to affect movement of the rotor 6. A position of the pushing part 3 is adjusted correspondingly based on a specific structure of the disposed vibration part 4. This is not specifically limited herein.

Optionally, the pushing part 3 is disposed to push the rotor 6 to move. Therefore, a quantity of pushing parts 3 and an orientation in which the pushing part 3 is disposed in the vibration part 4 need to be adjusted correspondingly based on a quantity and a position of rotors 6. This is not specifically limited herein. In addition, the disposed pushing part 3 may be a convex structure that is disposed in the vibration part 4 and that extends along the second direction W, or a cylindrical structure, so that the rotor 6 can be pushed to reciprocate along the first direction L. Alternatively, a specific structure and a specific extending direction of the pushing part 3 may be adjusted correspondingly based on a position of the disposed rotor 6, to make point contact or surface contact with the rotor 6 in fit with the pushing part 3, so as to drive, through movement along an elliptic track, the rotor 6 to move or rotate correspondingly. This is not specifically limited herein. Usually, anti-wear processing is performed on the disposed pushing part 3, or the pushing part 3 is coated with a wear-resistant layer, to avoid degradation of performance (for example, a driving force) of the motor due to abrasion of the pushing part 3 when the pushing part 3 pushes the rotor 6 to move.

To enable the disposed vibration part 4 to have a displacement transformation capability along a corresponding direction under the action of the excitation part 2 and under limiting by a corresponding first fixed part 5 and second fixed part 1, so that a connected pushing part 3 has a stable elliptic moving track, the disposed vibration part 4 may have a plurality of fitting manners. Details are as follows.

Figure 9:
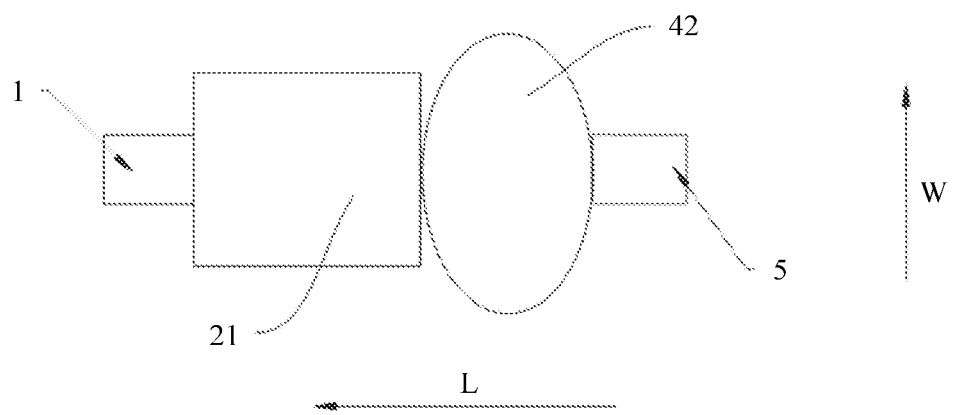
FIG. 9 is a simple schematic diagram of a structure of structural fitting of a first vibration part according to an embodiment of this application, where a direction indicated by an arrow L is a first direction, and a direction indicated by an arrow W is a second direction.

In an embodiment, as shown in FIG. 9, the disposed vibration part 4 may be an elastic part 42 with a deformation capability. When the excitation part 2 vibrates, under limiting by the first fixed part 5, the elastic part 42 can be deformed due to contraction or expansion at least along the first direction L, to drive the elastic part 42 to be deformed at least along the second direction W. The pushing parts 3 are disposed at two ends of the elastic part 42 in an elastic deformation direction (namely, the second direction W). The vibration part 4 is disposed as the elastic part 42 capable of elastic deformation. Under the action of vibration of the excitation part 2 and under limiting by displacement of the first fixed part 5 and the second fixed part 1, the vibration part 4 is subject to extrusion or tensile stress along the first direction L, so that the elastic part 42 is deformed due to contraction or expansion. In addition, when the elastic part 42 is deformed due to contraction (or expansion) along this direction, based on characteristics of the elastic part 42, the elastic part certainly expands (or contracts) along a direction other than the first direction L, that is, the second direction W. Deformation along the first direction L and deformation along the second direction W are combined, so that the vibration part 4 can have a phase difference in the first direction L and the second direction W, and can perform corresponding elliptic movement. In addition, the pushing part 3 disposed at an end of the vibration part 4 can form an elliptic moving track of regular movement to drive the rotor 6 to move, thereby improving stability of movement of the rotor 6.

Optionally, based on characteristics of the disposed elastic part 42, after the elastic part 42 is deformed due to extrusion or stretching along the first direction L, the elastic part 42 is more likely to be elastically deformed along the first direction L. Therefore, the second direction W may be set to be a direction perpendicular to the first direction L, and the pushing part 3 is disposed at an edge position, of the vibration part 4, that has the greatest deformation along the second direction W, to prevent other parts of the vibration part 4 from exceeding the pushing part 3 due to excessive deformation of the vibration part 4 to get in contact with the rotor 6 and interfere with movement of the rotor 6.

Figure 10:
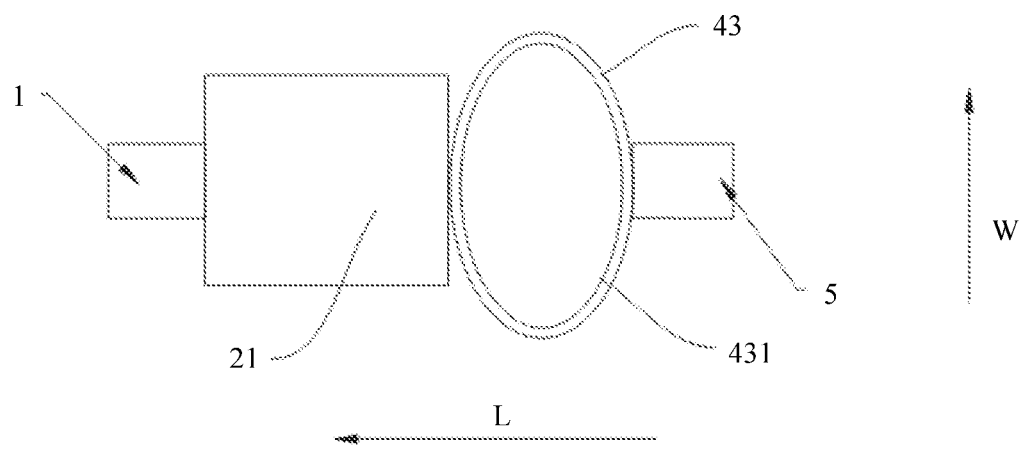
FIG. 10 is a simple schematic diagram of a structure of structural fitting of a second vibration part according to an embodiment of this application, where a direction indicated by an arrow L is a first direction, and a direction indicated by an arrow W is a second direction.

In another embodiment, as shown in FIG. 10, the disposed vibration part 4 may be alternatively disposed as an annular mechanical part 43. A structure of the annular mechanical part 43 is deformable under the action of an external force. Specifically, along the first direction L, the first fixed part 5 and the excitation part 2 are disposed opposite to each other (to be specific, the first fixed part 5 and the excitation part 2 are located on a same straight line along the first direction L, and have no height difference along the second direction W) on two sides of the annular mechanical part 43, and the annular mechanical part 43 has an inner wall 431. When the excitation part 2 vibrates, a distance between two opposite sides of the inner wall 431 along the first direction L increases, a distance between two opposite sides of the inner wall 431 along the second direction W decreases with the increase of the distance between the two opposite sides of the inner wall 431 along the first direction L, and the pushing part 3 is disposed at a position at which a distance between two opposite sides of the inner wall 431 can decrease; or a distance between two opposite sides of the inner wall 431 along the second direction W increases with a decrease of a distance between two opposite sides of the inner wall 431 along the first direction L, and the pushing part 3 is disposed at a position at which a distance between two opposite sides of the inner wall 431 can increase. The annular mechanical part 43 is disposed as an annular structure, so that a middle part has a hollow structure. When the excitation part 2 transmits vibration at a corresponding frequency, the excitation part 2 transmits the vibration to the annular structure along the first direction L through a connection position. In addition, under limiting by the connected first fixed part 5 and second fixed part 1, the annular structure is deformed under the action of tensile or extrusion stress, so that two connection positions, in the annular structure, that are respectively connected to the first fixed part 5 and the excitation part 2 move closer to or away from each other. That is, under limiting by a corresponding fixed part, vibration of the excitation part 2 along the first direction L can cause tensile or compressive stress to the annular structure, and a distance between two opposite sides of the inner wall 431 of the annular structure increases or decreases under the action of the stress. A movement pattern and a movement range of the increase or the decrease are determined based on the vibration of the excitation part 2. In addition, when the annular mechanical part 43 is deformed due to extrusion (or stretching) caused by the stress along the first direction L, deformation due to expansion (or extrusion) along the second direction W occurs based on transmission of the force. That is, at least along the second direction W, a distance between two opposite sides of the inner wall 431 of the annular structure decreases or increases as a distance between two opposite sides of the inner wall 431 along the first direction 1 increases or decreases, to drive a pushing part 3 disposed at a corresponding position to perform elliptic movement. On this basis, the pushing part 3 is disposed at an edge position close to an annular structure of a corresponding rotor 6. In addition, the pushing parts 3 are symmetrically arranged on two sides of the annular mechanical part 43 along the second direction W, and the pushing parts 3 are disposed at positions, in the annular mechanical part 43, at which a distance between two opposite sides of the inner wall 431 is the farthest, to prevent other parts of the annular structure from affecting the pushing part 3 pushing the rotor 6 to move when the annular structure is deformed.

Figure 5:
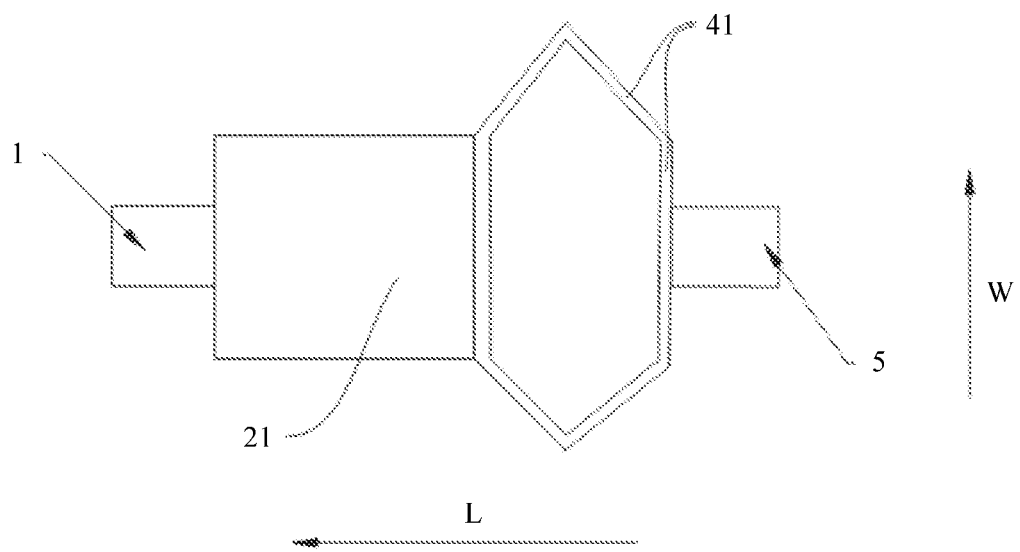
FIG. 5 is a simple schematic diagram of a structure of connections between parts in a stator according to an embodiment of this application, where a direction indicated by an arrow L is a first direction, and a direction indicated by an arrow W is a second direction.

In still another embodiment, as shown in FIG. 5, the disposed vibration part 4 may also include a connecting rod 41. There are two or more connecting rods 41. At least two adjacent connecting rods 41 are connected and form a connecting end, and there is a first included angle between the connected connecting rods. When the excitation part 2 vibrates, the first included angle can increase or decrease, so that the vibration part 4 can be deformed. The pushing part 3 is disposed at a position close to the connecting end. A corresponding vibration part 4 is formed through structural fitting between connecting rods 41. In this manner of disposing the connecting rods 41, along the first direction L, two outermost connecting rods 41 are respectively connected to the excitation part 2 and the first fixed part 5, and the other end of the excitation part 2 is connected to the second fixed part 1. Under limiting by the two fixed parts, vibration of the excitation part 2 can act on the vibration part 4. The connecting rods 41 are subject to extrusion or tensile stress, so that the first included angle increases or decreases correspondingly. When the first included angle changes, two ends of the connecting rods 41 that are respectively connected to the excitation part 2 and the first fixed part 5 are close to or away from each other, and the connecting rods 41 also move correspondingly along the second direction W. Therefore, the connecting rods 41 have a phase difference in the first direction L and the second direction W, and at least a part of the connecting rods 41 can form an elliptic moving track. In this structural fitting, the specified second direction W may be properly adjusted based on a position and a direction of the specified first included angle. This is not specifically limited herein. In addition, for the pushing part 3 disposed on the connecting rod 41, because a position of the first included angle between connecting rods 41 is most affected by deformation in a process in which the connecting rod 41 moves correspondingly with a frequency of vibration, the pushing part 3 may be disposed at a position close to the first included angle, to prevent the connecting rod 41 from getting in direct contact with the rotor 6 due to deformation. In addition, a corresponding vibration part 4 is formed through structural fitting between connecting rods 41, so that structural stability of the vibration part 4 can be higher. When the excitation part 2 transmits vibration at a corresponding frequency, the vibration part 4 can better absorb the vibration, so that stability of frequency control is higher. In addition, in this structural fitting between connecting rods 41, when vibration at a corresponding frequency acts on the vibration part 4 and the connecting rods 41 are deformed correspondingly with the vibration, controllability is high, and the connecting rods 41 can move correspondingly based on a required direction and amplitude, to form a required elliptic moving track. In addition, during movement along the track, the rotor 6 in fit needs to be driven to move correspondingly, and the connecting rods 41 are not likely to be subject to out-of-plane deviation from the elliptic moving track based on strength of a structure of the connecting rods 41 and under limiting by the first fixed part 5 and the second fixed part 1, so that the pushing part 3 connected to the connecting rods 41 can stably drive the rotor 6 to move.

In this embodiment, for structural fitting between connecting rods 41, in limited space in the miniaturized motor, the connecting rods 41 may be combined to form different structures based on a position at which the rotor 6 can be disposed relative to the stator and according to different requirements for a movement pattern, a movement range, and the like of the rotor 6. Specifically, the structures may include but are not limited to the following several types.

Optionally, as shown in FIG. 11, two connecting rods 41 may be disposed, and the connecting rods 41 are connected to form a structure in a V shape 411, to form a first included angle. Two ends of the two connecting rods 41 are respectively connected to the excitation part 2 and the first fixed part 5, and the pushing part 3 is connected to a connecting end. When the excitation part 2 vibrates, the first included angle can increase or decrease under the action of a tensile force or an extrusion force applied to the vibration part 4. In the vibration part 4 formed by the connecting rods 41 in this structural fitting, the pushing part 3 may be disposed at an end (that is, the connecting end) of a sharp corner in the structure in the V shape 411, and the pushing part 3 is oriented toward a corresponding rotor 6. The V shape 411 may also be a convex structure whose connecting end is oriented toward the rotor 6, to help drive the rotor 6. In this structure in the V shape 411, the V shape 411 has specific stability and strength. Therefore, when the V shape 411 is subject to pressure and the first included angle changes, controllability of driving the pushing part to perform corresponding elliptic movement is high, thereby improving stability of driving the rotor 6 to move.

Specifically, in this structural fitting, structural stability of fitted connecting rods 41 is high, and under the action of vibration at a corresponding frequency, the connecting rods 41 can form a stable elliptic moving track to drive the rotor 6 to move. Without changing a quantity and a connection direction of connecting rods 41, to improve stability of the connecting rod 41 so that movement of the connecting rod 41 in a corresponding direction is higher when the connecting rod 41 is subject to a tensile force or an extrusion force, the connecting rod 41 may be disposed as a structure with non-uniform cross sections. For example, a cross-sectional area of the connecting rod 41 gradually increases along an axial direction of the connecting rod 41 and in a direction away from the connecting end. In this manner, a cross section gradually changes, so that structural stability of the connecting rod 41 connecting the excitation part 2 and the first fixed part 5 is higher, and vibration from the excitation part 2 can be better transmitted, without affecting an increase or a decrease of the first included angle. Movement of the rotor 6 can be controlled by using a low frequency, thereby improving a use effect of the drive assembly.

Figure 17:
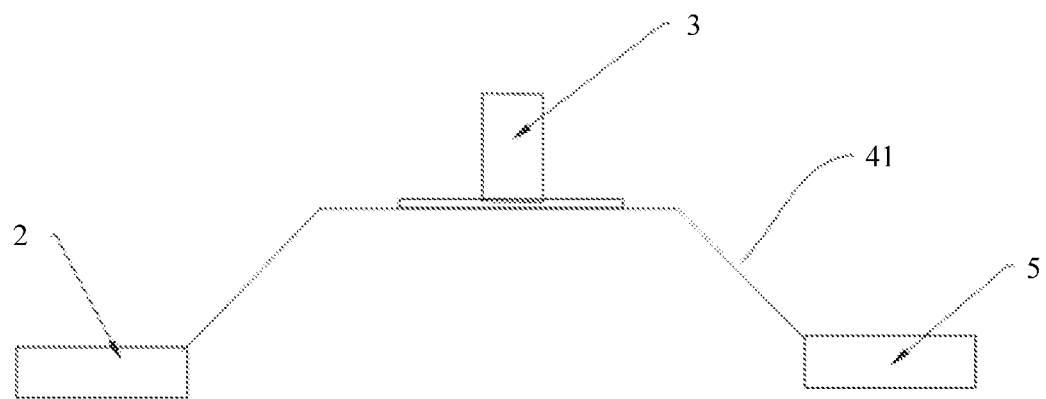
FIG. 17 is a simple schematic diagram of a structure of structural fitting of a sixth vibration part according to an embodiment of this application.

Alternatively, as shown in FIG. 17, three connecting rods 41 may be disposed, and the connecting rods 41 are sequentially connected to form an open structure, so that two first included angles can be formed. Two outermost connecting rods 41 are respectively connected to the excitation part 2 and the first fixed part 5. When the excitation part 2 vibrates, the first included angle can increase or decrease. The pushing part 3 is connected to the connecting rod 41 located in the middle. In this structural fitting between connecting rods 41, at least three connecting rods 41 are sequentially connected, and a first included angle is formed between every two adjacent connecting rods 41. In a design of this structure, the pushing part 3 is connected to the connecting rod 41 at the middle position, so that stability and reliability of the connection between the pushing part 3 and the connecting rod 41 can be improved, and the pushing part 3 is not easily damaged when pushing the rotor 6 to move, thereby extending a service life of the pushing part 3.

Figure 18:
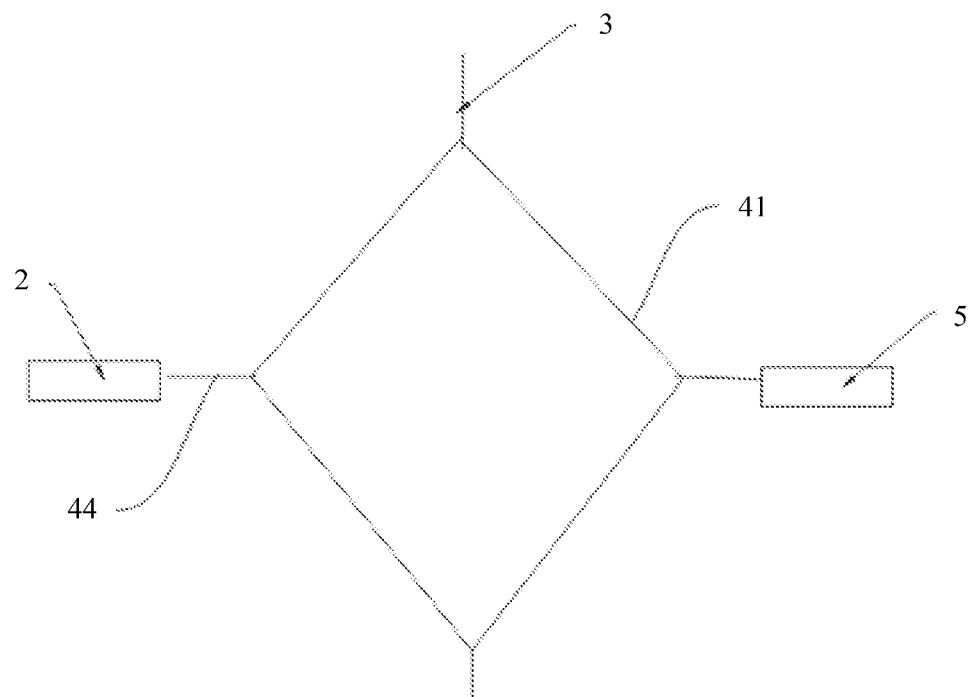
FIG. 18 is a simple schematic diagram of a structure of structural fitting of a seventh vibration part according to an embodiment of this application.

Alternatively, as shown in FIG. 18, four or more connecting rods 41 may be disposed, the plurality of connecting rods 41 are connected head to tail to form an enclosed polygonal structure, and a first included angle is formed between adjacent connecting rods 41. The excitation part 2 and the first fixed part 5 each are connected to the connecting end along the first direction L, and the pushing part 3 is connected to a connecting end along the second direction W; or the excitation part 2 and the first fixed part 5 each are connected to the connecting rod 41 along the first direction L, and the pushing part 3 is connected to the connecting rod 41 along the second direction W. The polygonal structure is connected to the excitation part 2 and the first fixed part 5. A polygonal mechanical part with a stable structure is formed in this manner, so that structural stability of the vibration part 4 is improved. When the pushing part 3 pushes the rotor 6 to move, an elliptic moving track does not deviate due to poor stability to reduce stability of movement of the rotor 6.

Regardless of which one of the foregoing structural fitting manners is used for the connecting rods 41, lengths of the connecting rods 41 may be the same or different. For the first included angle formed between the connecting rods 41, the first included angle is a non-zero included angle, and the included angle can meet a change range allowed for the first included angle when a required elliptic moving track is formed under the action of vibration at different frequencies. This is not specifically limited herein. In addition, for the specified first included angle, based on a specific structure of fitting between connecting rods 41, to make the specified first included angle ensure structural stability of the vibration part 4 in the case of different structures and to adjust the first included angle at a low frequency to reduce energy consumption, ranges of preferred first included angles for vibration parts 4 in different structures may also be different. This is not specifically limited herein.

Optionally, for a structure of the disposed connecting rods 41, to make the first included angle change more smoothly to reduce energy consumption when the fitting structure between the disposed connecting rods 41 connects the connecting rods 41, the plurality of connecting rods are rotatably connected. In this fitting structure of rotatable connection, specific stability of the connection between the connecting rods 41 is required, so that the connecting rods 41 are not easily deformed. Therefore, the rotatable connection may be arranged as a stable structure that is not likely to be excessively deformed during rotation. Alternatively, in the miniaturized motor, a range of movement of the rotor 6 driven by the stator is not large, so that change ranges of the connecting rods 41 and the first included angle are small when the disposed vibration part 4 forms an elliptic moving track through deformation. Therefore, the plurality of connecting rods 41 may be disposed as an integrally molded metal piece. Metal connecting rods 41 have a specific deformation capability, so that elastic deformation of a metal piece corresponding to the connecting rods 41 can meet a requirement.

Figure 13:
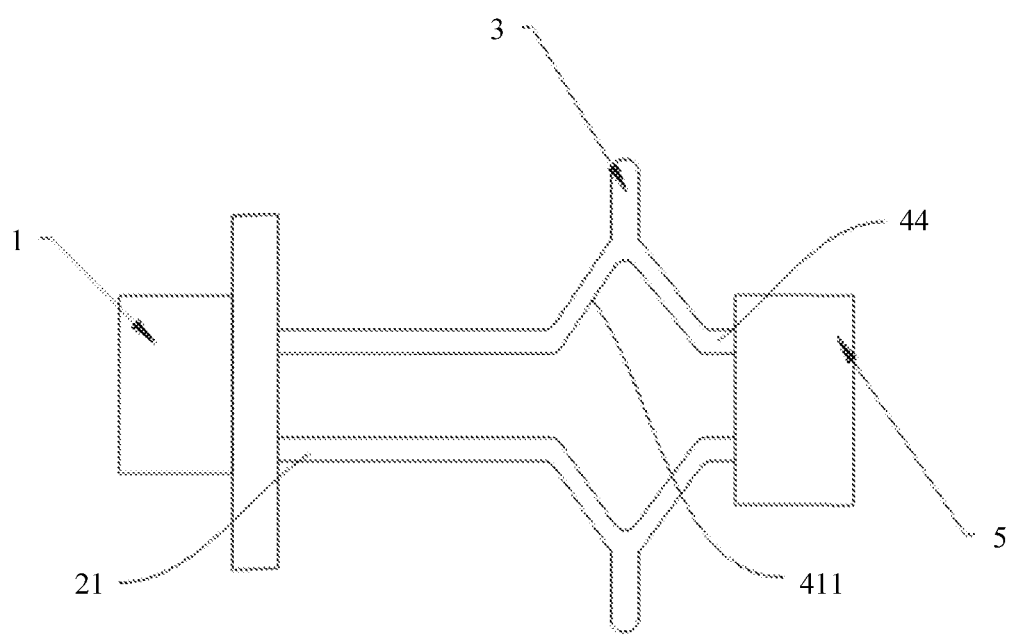
FIG. 13 is a simple schematic diagram of a structure of connections between parts other than a driving part in FIG. 11.
Figure 14:
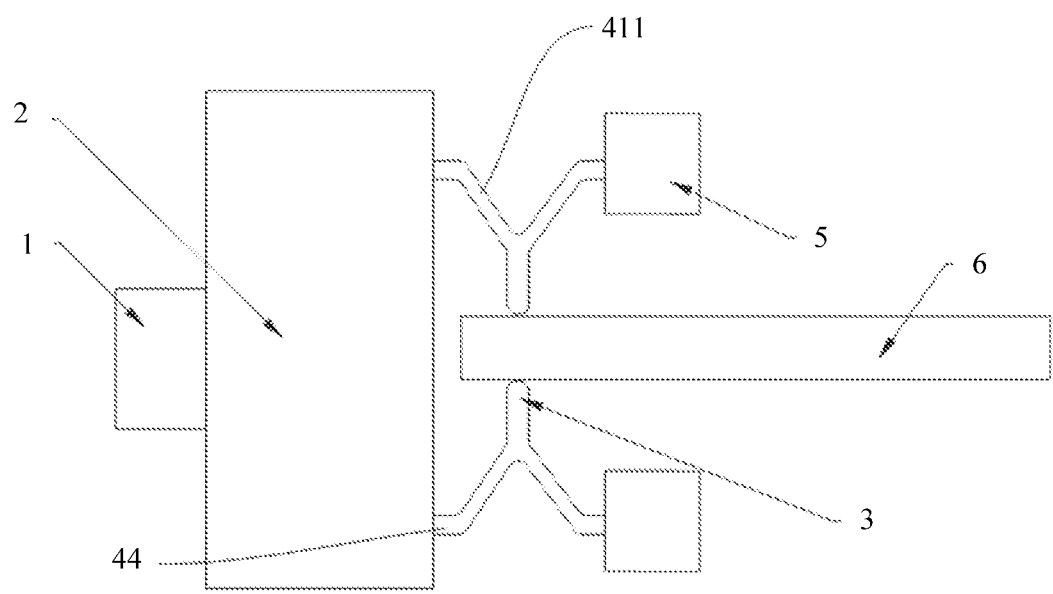
FIG. 14 is a simple schematic diagram of a structure of structural fitting of a fifth vibration part according to an embodiment of this application.
Figure 15:
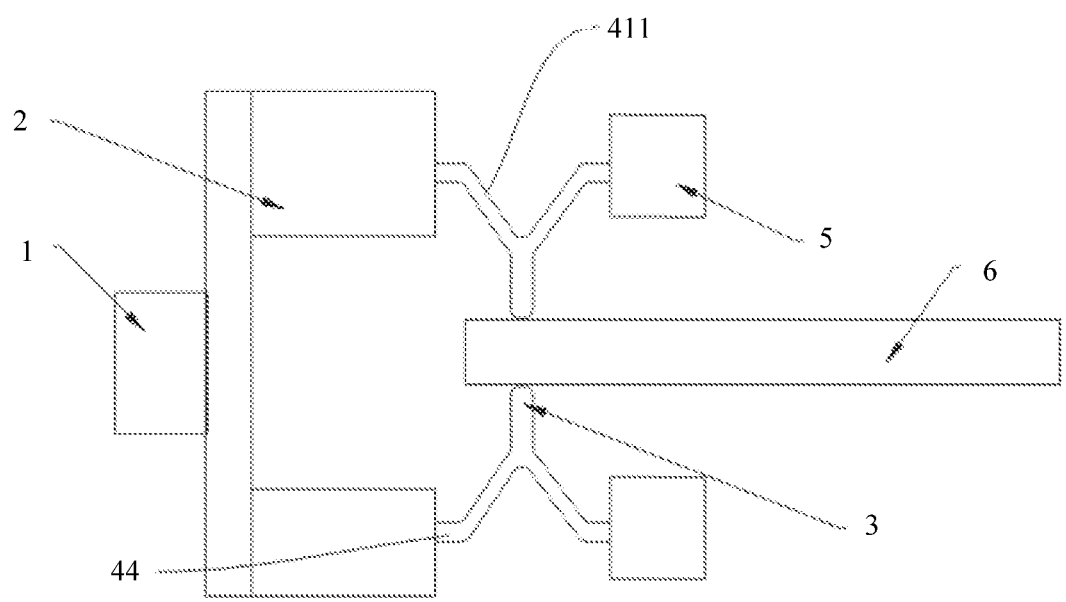
FIG. 15 is a simple schematic diagram of a structure of another excitation part in FIG. 13.
Figure 16:
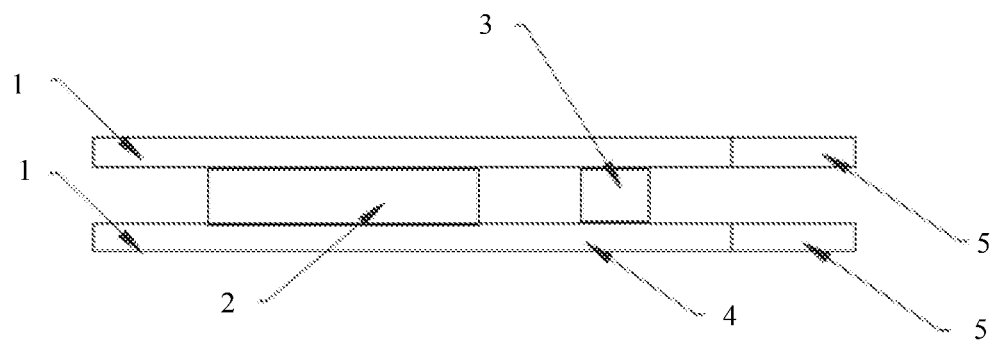
FIG. 16 is a simple schematic diagram of a structure of a stator according to an embodiment of this application.

Herein, it should be emphasized that the second fixed part 1, the excitation part 2, the vibration part 4, and the first fixed part 5 that are disposed may be connected in a full contact manner, may be connected by using a plurality of connection points and linkages 44 (as shown in FIG. 18), or may be connected in another manner that can be implemented. This is not specifically limited herein. In addition, quantities and fitting positions of second fixed parts 1, excitation parts 2, vibration parts 4, and first fixed parts 5 that are disposed may be combined correspondingly based on a quantity and fitting positions of rotors 6 that are disposed, to drive the rotor 6 under different miniaturization conditions. As shown in FIG. 15, when inner space and a position of the rotor 6 are limited, the rotor 6 cannot be disposed on an upper or lower side of the stator or sleeved on the stator, and a position is reserved for the rotor 6 only at a middle position. To implement stable and high-precision control on movement of the rotor 6 in this space, the vibration parts 4 in the foregoing different forms may be disposed on the upper and lower sides of the rotor 6, and the first fixed parts 5 may be respectively fastened on the upper and lower sides (or one first fixed part 5 is fastened to both vibration parts 4, as shown in FIG. 13 and FIG. 14) to connect to different vibration parts 4. To enable the two vibration parts 4 on the upper and lower sides to form mirror elliptic moving tracks to drive the rotor 6 to move, the two vibration parts 4 may be connected to a same excitation part 2 to drive the rotor 6 at a middle position. Alternatively, stators formed by two or more groups of second fixed parts 1, excitation parts 2, vibration parts 4, and first fixed parts 5 may be connected to form a new stator. In this fitting structure, excitation parts 2 and pushing parts 3 are connected between two groups of second fixed parts 1, vibration parts 4, and first fixed parts 5 that are connected (as shown in FIG. 17). In this structural fitting, when a corresponding component bends out of a plane formed by the vibration parts 4, the fixed parts, and the like, strong shear stress is generated between the component and the pushing part 3 and the excitation part 2. The shear stress makes the component return to the original plane, thereby limiting swing out of the plane. In addition, due to symmetry of the design, an out-of-plane resonant mode in this manner is not easily excited. In addition, the pushing part 3 may be directly made of a whole piece of wear-resistant material instead of using a coating method. This also enhances an anti-wear capability in this embodiment.

Figure 3:
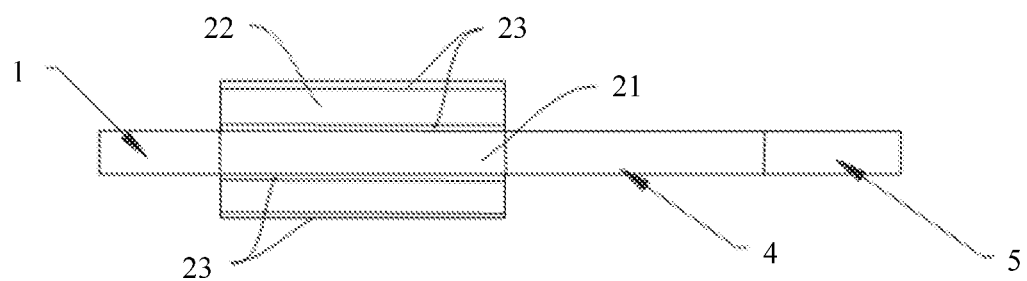
FIG. 3 is a top view of FIG. 2.
Figure 4:
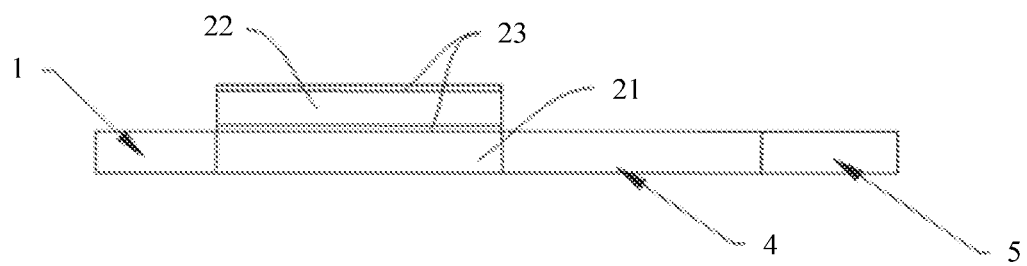
FIG. 4 is another top view of FIG. 2.

This application further provides a specific implementation. As shown in FIG. 3 and FIG. 4, to implement single-phase driving for the disposed excitation part 2 so that the excitation part 2 can vibrate at a corresponding frequency (a resonator frequency) and space occupied in fitting of a driving structure can be reduced in a simple driving mode, the excitation part 2 includes a body 21 and a driving part. The body 21 is configured to connect to the vibration part 4. The driving part is connected to the body 21, and is configured to drive, in a single-phase mode, the body 21 to vibrate. The driving part has a preset vibration frequency, and under the action of the preset vibration frequency, vibration of the body 21 is capable of causing the vibration part 4 to vibrate at least along the first direction L and the second direction W. The preset vibration frequency is a frequency mode, obtained through experiments, in which an elliptic moving track can be formed at a required position (a position at which the pushing part 3 is disposed) in corresponding structural fitting of the excitation part 2, the vibration part 4, and the first fixed part 5. The preset vibration frequency varies based on different actual conditions and according to different fitting and movement requirements of the rotor 6, provided that the pushing part 3 can form a required elliptic moving track. This is not specifically limited herein.

Specifically, for the provided driving part, to act as a power provider to drive the body 21 to vibrate correspondingly based on a required frequency mode, and to make the body 21 connected to the driving part have a good vibration effect, the driving part is connected to at least one side of the body 21 along the second direction W, so that the driving part directly transform vibration energy and transmit it to the body 21. In a fixed connection manner through bonding or other direct contact fitting, the vibration can be transmitted to the body 21 to the maximum extent, and structural stability of the connection between the driving part and the body 21 is high. During vibration, the driving part is not easily detached from the body 21. In addition, to reduce loss of vibration transmitted to the body 21, the body 21 may be disposed as a hollowed-out structure, and the driving part is disposed in the hollowed-out structure (as shown in FIG. 1) in a protruding or non-protruding manner. In this fitting manner, stability of vibration when the vibration is transmitted to the body 21 is improved, thereby ensuring a good vibration effect. Herein, it should be emphasized that a specific structure of the body 21 may be disposed as a plurality of different structures according to requirements, as shown in FIG. 5, FIG. 6, FIG. 7, and FIG. 8, for example, a hollowed-out structure, an integral plate-like structure, or a combination of a plurality of linear structures. This is not specifically limited herein.

Figure 19:
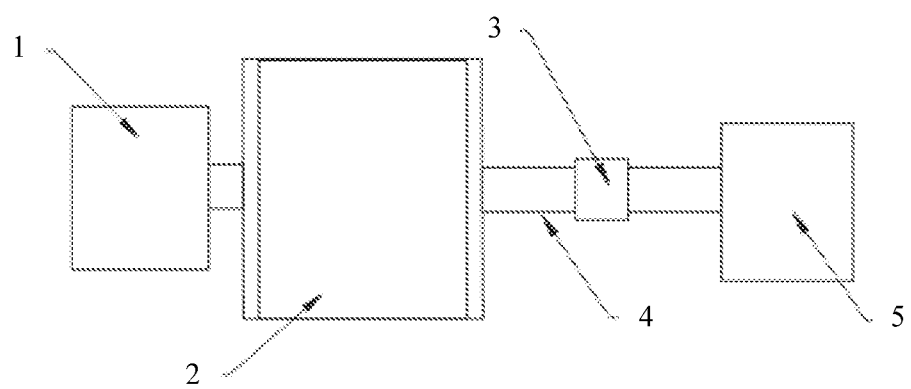
FIG. 19 is a main view of another stator according to an embodiment of this application.
Figure 20:
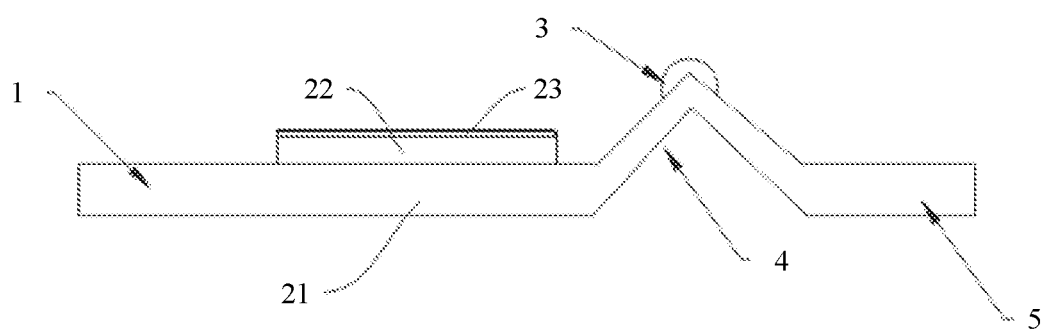
FIG. 20 is a top view of another stator according to an embodiment of this application.

Optionally, for the first fixed part 5, the body 21, the vibration part 4, and the second fixed part 1 that are connected, all parts may be located on a same plane, as shown in FIG. 11. To be specific, the connecting rods 41 with the first included angle and the pushing part 3 that are used in the vibration part all extend toward the rotor 6 that is at least partially located on the plane, so that a part at which the vibration part 4 is in contact with the rotor 6 performs corresponding elliptic movement on the plane, and the rotor 6 is driven to reciprocate. Alternatively, as shown in FIG. 19 and FIG. 20, the disposed vibration part 4 and the pushing part 3 connected to the vibration part 4 may extend along a direction out of the plane through at least partial deformation after being connected to a corresponding first fixed part 5 and a corresponding body 21 on the plane, so that the pushing part 3 abuts against the rotor 6 on another plane. That is, the vibration part 4 and/or the pushing part 3 partially protrude from the plane, so as to be at least partially coplanar with the body 21, the fixed parts, and the like. Therefore, specific structural fitting of the vibration part 4 and the pushing part 3 and connections with the body 21, the fixed parts, and the like may be adaptively adjusted based on different position layouts of the rotor 6 in the drive assembly, different elliptic moving tracks required, different vibration amplitudes and vibration directions of the vibration part 4, and the like. This is not specifically limited herein.

More specifically, to enable the driving part to transform electric energy into vibration in a required frequency mode, the driving part includes a deformable part 22 and an energizing part 23. The deformable part 22 is connected to the body 21, and the deformable part 22 may be connected to the body 21 through bonding. The deformable part 22 is deformable after being energized. The energizing part 23 is connected to the deformable part 22, and electricity generated by the energizing part 23 can be transmitted to the deformable part 22. The energizing part 23 can generate an electric field at a frequency after being energized, and the deformable part 22 is deformed under the action of the electric field to drive the body 21 to vibrate at a preset vibration frequency (that is, deformation of the deformable part 22 can drive the body 21 to perform corresponding deformation movement), so that the body 21 is deformed due to contraction or expansion along the first direction L. In addition, under limiting by a corresponding fixed part, a tensile force or an extrusion force for reciprocating movement is applied to the vibration part 4, so that the vibration part 4 vibrates along the first direction L and the second direction W. The disposed deformable part 22 can be deformed to different extent based on an electrical frequency of the energizing part 23, so that the connected body 21 vibrates correspondingly. The disposed deformable part 22 is made of an electrostrictive material, for example, a piezoelectric material, a magnetostrictive material, or a shape memory alloy. This is not specifically limited herein. To make the deformable part 22 deformable after being energized, the energizing part 23 is disposed, and an electrical connection can be implemented when the energizing part 23 is connected to a power supply.

As shown in FIG. 3, one or more energizing parts 23 and deformable parts 22 that are disposed may constitute a piezoelectric patch, and electrodes are respectively connected to two outermost surfaces of the piezoelectric patch. The electrodes are connected to two ends of a drive. Driving may be performed by using a sine wave, a square wave, a triangular wave, a trapezoidal wave, or the like. This is not limited. The sine wave is preferred. However, for specific structural fitting of a connection between the electrodes and the drive, for example, whether single-ended driving or double-ended driving is performed, the specific structure is adjusted correspondingly based on different situations. This is not specifically limited herein.

Figure 6:
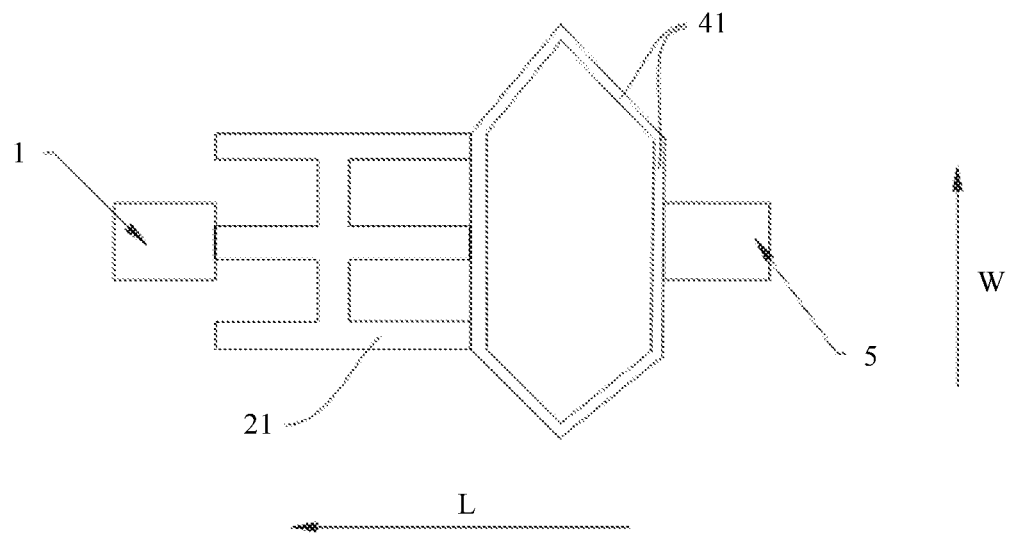
FIG. 6 is a simple schematic diagram of a structure of connections between parts in another stator according to an embodiment of this application, where a direction indicated by an arrow L is a first direction, and a direction indicated by an arrow W is a second direction.
Figure 7:
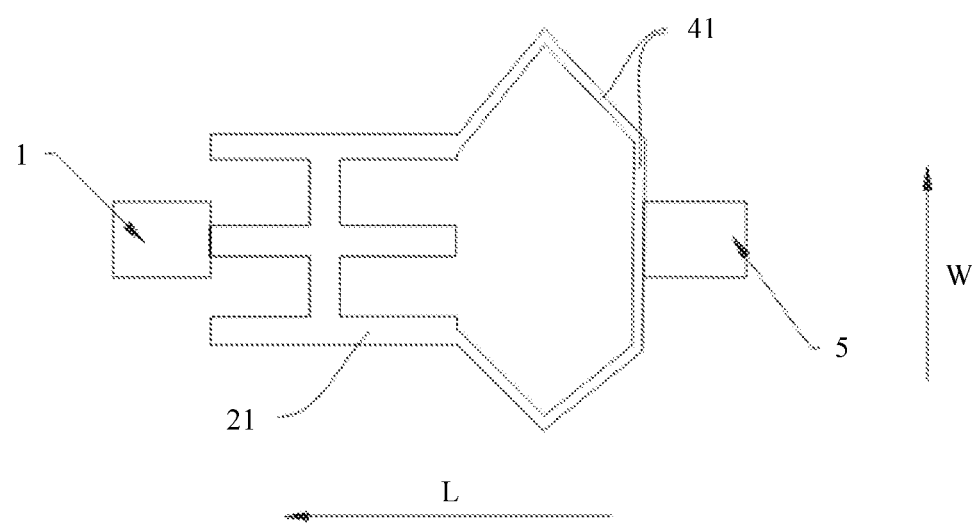
FIG. 7 is a simple schematic diagram of a structure of connections between parts in still another stator according to an embodiment of this application, where a direction indicated by an arrow L is a first direction, and a direction indicated by an arrow W is a second direction.
Figure 8:
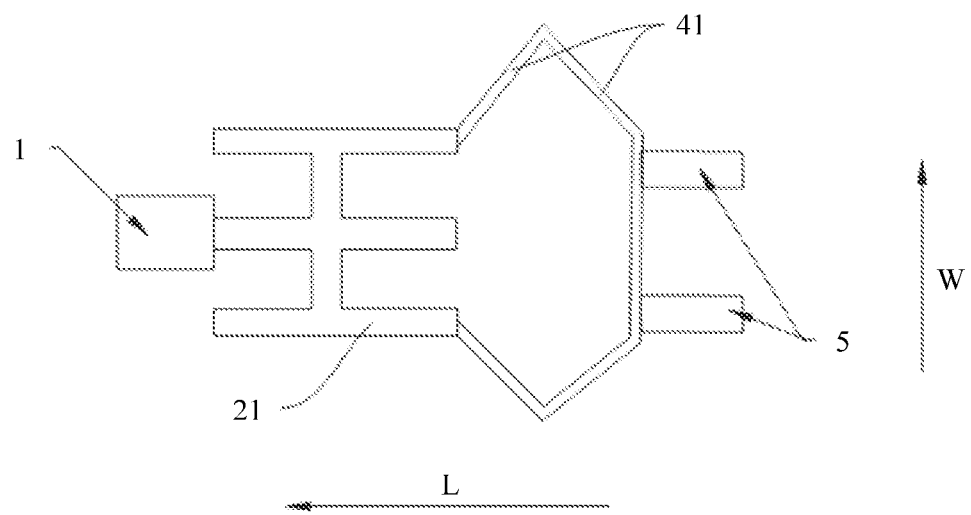
FIG. 8 is a simple schematic diagram of a structure of connections between parts in yet another stator according to an embodiment of this application, where a direction indicated by an arrow L is a first direction, and a direction indicated by an arrow W is a second direction.
Figure 12:
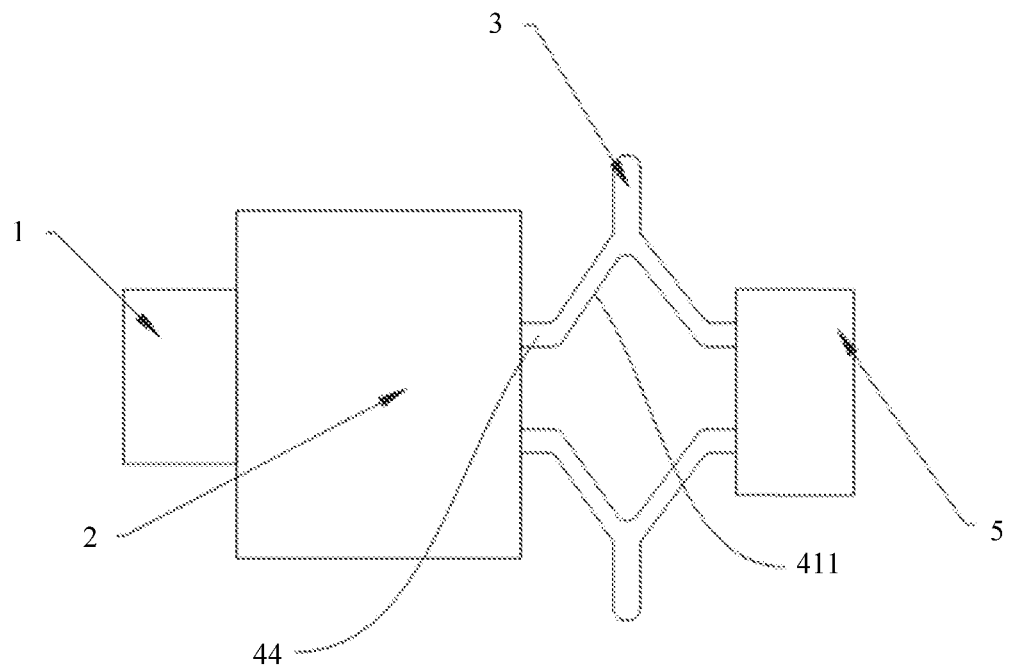
FIG. 12 is a simple schematic diagram of a structure of structural fitting of a fourth vibration part according to an embodiment of this application.

Optionally, as shown in FIG. 12 and FIG. 13, for the second fixed part 1, the body 21, the vibration part 4, and the first fixed part 5 that are disposed, when the vibration part 4 is disposed in a structure of the annular mechanical part 43 or the connecting rods 41 (as shown in FIG. 6 and FIG. 11) that can be deformed due to structural fitting, to enable the vibration part 4 to have a good deformation effect, where deformation of the vibration part 4 is micro deformation, and to fully transmit a vibration force, the vibration part 4 is disposed as a metal sheet, a metal rod, or other structures. In addition, when the vibration part 4 is connected to the body 21, the first fixed part 5, and the second fixed part 1, to ensure that the structure is stable and not easily damaged, all parts are disposed as metal pieces, and all parts are integrally molded.

The foregoing metal pieces may be directly connected, or may be connected by using another structure, for example, the linkage 44. When the metal pieces are connected by using a connector similar to the linkage 44, stiffness of a connection between the excitation part 2, the vibration part 4, and the first fixed part 5 can be reduced. When the excitation part 2 transmits vibration, compared with a direct contact-based large-area surface connection with high stiffness, a vibration transmission effect can be better in this structural fitting.

However, it should be noted that a part of this patent application document includes content protected by copyright. The copyright owner reserves the copyright except for making copies of patent documents of the China National Intellectual Property Administration or recorded content of patent documents.

What is claimed is:

1. A drive assembly comprising a stator and a rotor, the stator is configured to drive the rotor to move, and the stator comprises:
   an excitation part;
   a vibration part connected to the excitation part;
   a first fixed part connected to the vibration part, and the vibration part is located between the excitation part and the first fixed part along a first direction; and
   a pushing part connected to the vibration part and the rotor, wherein under limiting by the first fixed part, the excitation part is configured to vibrate and to drive the vibration part to vibrate at least along the first direction and a second direction, so that the pushing part pushes the rotor to move along the first direction; and
   the first fixed part is configured to limit moving distances of the pushing part along the first direction and the second direction.

2. The drive assembly according to claim 1, wherein the vibration part is deformable; and
   under limiting by the first fixed part, vibration of the excitation part is configured to deform the vibration part at least along the first direction and the second direction, and the pushing part is disposed at a position, in the vibration part, that is deformable along the first direction and the second direction.

3. The drive assembly according to claim 2, wherein the vibration part is an annular mechanical part;
   along the first direction, the first fixed part and the excitation part are disposed opposite to each other on two sides of the annular mechanical part, and the annular mechanical part has an inner wall; and
   when the excitation part vibrates, a distance between two opposite sides of the inner wall along the first direction increases, a distance between two opposite sides of the inner wall along the second direction decreases, and the pushing part is disposed at a position at which a distance between two opposite sides of the inner wall decreases; or
   a distance between two opposite sides of the inner wall along the first direction decreases, a distance between two opposite sides of the inner wall along the second direction increases, and the pushing part is disposed at a position at which a distance between two opposite sides of the inner wall increases.

4. The drive assembly according to claim 3, wherein the pushing parts are symmetrically arranged on two sides of the annular mechanical part along the second direction, and the pushing parts are disposed at positions, in the annular mechanical part, at which a distance between two opposite sides of the inner wall is the farthest.

5. The drive assembly according to claim 2, wherein the vibration part is an elastic part, and the vibration part is elastically deformable at least along the first direction and the second direction; and
   the pushing parts are disposed at two ends of the elastic part in an elastic deformation direction.

6. The drive assembly according to claim 2, wherein the vibration part comprises two or more connecting rods, at least two adjacent connecting rods are connected and form a connecting end, and there is a first included angle between the connected connecting rods;
   when the excitation part vibrates, the first included angle is configured to increase or decrease, so that the vibration part is deformable; and
   the pushing part is disposed at a position close to the connecting end.

7. The drive assembly according to claim 6, wherein there are two connecting rods, and the connecting rods are connected to form a structure in a V shape, to form the first included angle;
   the two connecting rods are respectively connected to the excitation part and the first fixed part; and
   the pushing part is connected to the connecting end.

8. The drive assembly according to claim 7, wherein a cross-sectional area of the connecting rod gradually increases along an axial direction of the connecting rod and in a direction away from the connecting end.

9. The drive assembly according to claim 6, wherein there are three connecting rods, and the connecting rods are sequentially connected to form an open structure;
   two outermost connecting rods are respectively connected to the excitation part and the first fixed part; and
   the pushing part is connected to the connecting rod located in the middle.

10. The drive assembly according to claim 6, wherein there are four or more connecting rods, and the plurality of connecting rods are connected head to tail to form an enclosed polygonal structure; and
    the excitation part and the first fixed part each are connected to the connecting end along the first direction, and the pushing part is connected to the connecting end along the second direction; or
    the excitation part and the first fixed part each are connected to the connecting rod along the first direction, and the pushing part is connected to the connecting rod along the second direction.

11. The drive assembly according to claim 6, wherein the plurality of the connecting rods are integrally molded.

12. The drive assembly according to claim 1, wherein the pushing part is a convex structure extending from the vibration part along the second direction, and the convex structure is capable of pushing the rotor to reciprocate along the first direction.

13. The drive assembly according to claim 1, wherein the stator further comprises a second fixed part, configured to enable vibration of the excitation part to act on the vibration part; and along the first direction, the second fixed part is connected to a side, of the excitation part, that is away from the vibration part, and a distance between the first fixed part and the second fixed part is fixed.

14. The drive assembly according to claim 1, wherein the excitation part comprises:

a body configured to connect to the vibration part; and a driving part connected to the body, and configured to drive, in a single-phase mode, the body to vibrate, wherein the driving part has a preset vibration frequency, and under the action of the preset vibration frequency, vibration of the body is configured to cause the vibration part to vibrate at least along the first direction and the second direction.

15. The drive assembly according to claim 14, wherein the driving part is connected to at least one side of the body along the second direction.

16. The drive assembly according to claim 14, wherein the driving part comprises:

a deformable part connected to the body, and the deformable part is deformable after being energized; and an energizing part connected to the deformable part, and electricity generated by the energizing part is configured to be transmitted to the deformable part, wherein the energizing part is configured to generate an electric field at the preset frequency, and the deformable part is deformed under the action of the electric field to drive the body to vibrate.

17. The drive assembly according to claim 15, wherein the body, the vibration part, and the first fixed part are integrally molded.

18. A motor comprising a drive assembly, wherein the drive assembly comprises a stator and a rotor, the stator is configured to drive the rotor to move, and the stator comprises:

an excitation part;

a vibration part connected to the excitation part;

a first fixed part connected to the vibration part, and the vibration part is located between the excitation part and the first fixed part along a first direction; and a pushing part connected to the vibration part and the rotor, wherein under limiting by the first fixed part, the excitation part is configured to vibrate and to drive the vibration part to vibrate at least along the first direction and a second direction, so that the pushing part pushes the rotor to move along the first direction; and the first fixed part is configured to limit moving distances of the pushing part along the first direction and the second direction.

19. The motor according to claim 18, wherein the vibration part is deformable; and under limiting by the first fixed part, vibration of the excitation part is configured to deform the vibration part at least along the first direction L and the second direction W, and the pushing part is disposed at a position, in the vibration part (4), that is deformable along the first direction and the second direction.

20. A terminal, comprising a motor, wherein the motor comprises a drive assembly, wherein the drive assembly comprises a stator and a rotor, the stator is configured to drive the rotor (6) to move, and the stator comprises:

an excitation part;

a vibration part connected to the excitation part;

a first fixed part connected to the vibration part, and the vibration part is located between the excitation part and the first fixed part along a first direction; and a pushing part connected to the vibration part and the rotor, wherein under limiting by the first fixed part, the excitation part is configured to vibrate and to drive the vibration part to vibrate at least along the first direction and a second direction, so that the pushing part pushes the rotor to move along the first direction; and the first fixed part is configured to limit moving distances of the pushing part along the first direction and the second direction.

* * * * *